March 19, 1929.  M. OKOCHI ET AL  1,705,643
METHOD OF MANUFACTURING METALLIC RINGS FOR PACKING PURPOSES
Filed Jan. 13, 1927
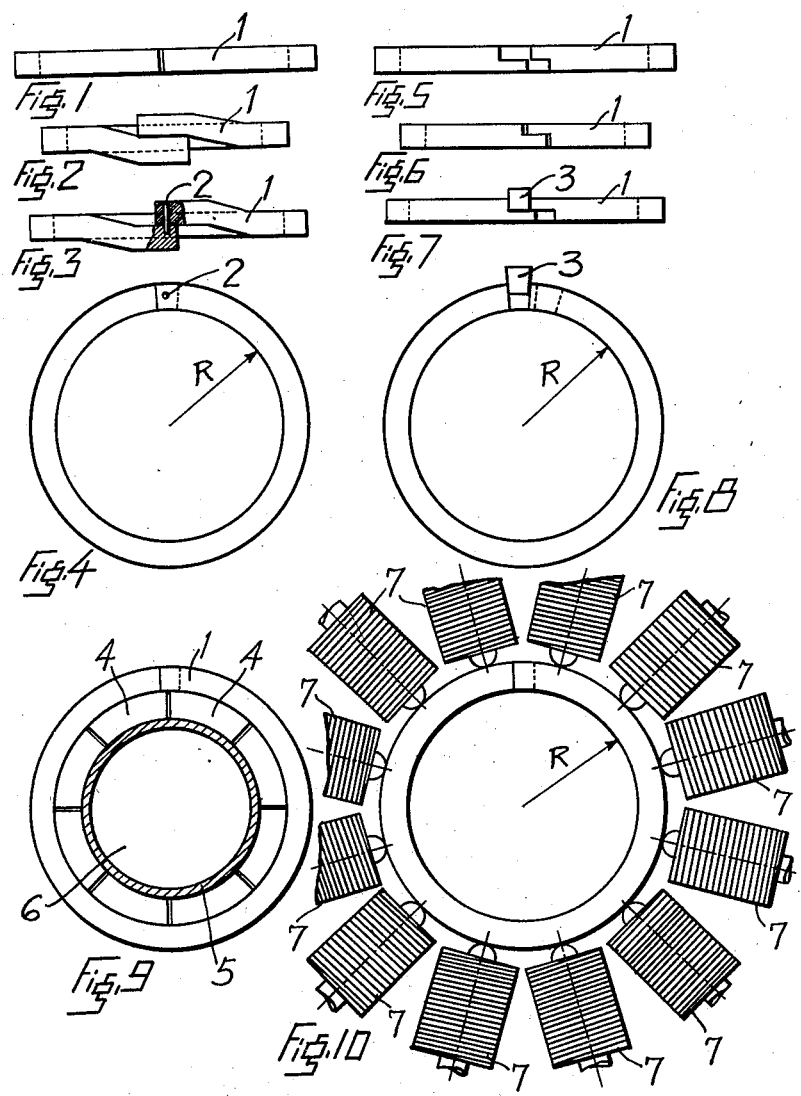
Inventors:
M. Okochi and
K. Ebihara
By Attorneys: Marks & Clerk Patented Mar. 19, 1929.

1,705,643

UNITED STATES PATENT OFFICE.

MASATOSI OKOCHI, OF SHITAYA-KU, TOKYO, AND KEIKICHI EBIHARA, OF KOISHI-KAWA-KU, TOKYO, JAPAN, ASSIGNORS TO ZAIDAN HOJIN RIKAGAKU KENKYUJO, OF HONGO-KU, TOKYO, JAPAN.

METHOD OF MANUFACTURING METALLIC RINGS FOR PACKING PURPOSES.

Application filed January 13, 1927, Serial No. 161,007, and in Japan July 29, 1926.

The present invention relates to a method of manufacturing metallic packing rings or the like and the principal object thereof is to construct a packing ring which forms a perfect and durable fluid tightness with the minimum frictional resistance and economy in cost.

In the accompanying drawings which show one embodiment for carrying out our invention;

Fig. 1 is an elevation of a split ring;

Fig. 2 is an elevation of the ring illustrated in Fig. 1 showing the ends lapped over making the ring smaller;

Fig. 3 is an elevation of Fig. 2, illustrating the position of the ends with a tangential force applied thereto;

Fig. 4 is a plan view of Fig. 3;

Figs. 5 and 6 are elevations of a stepped jointed split ring;

Fig. 7 is an elevation of a stepped jointed split ring in which the ends are separated by a wedge;

Fig. 8 is a plan view of Fig. 7;

Fig. 9 is a sectional plan view showing the packing ring applied to a piston rod of small diameter; and, Fig. 10 is a plan view of an electromagnetic chuck showing the split ring held in position after its ends have been separated thereby.

The method of manufacturing the split metallic packing ring consists in first bending a metallic rod 1 in the form of a circle, overlapping the ends of the metallic ring so that the inner diameter is less than the outer diameter of the shaft or rod on which it is to be used. As shown in Fig. 3 the ring is provided with apertures 2 at its ends which are adapted to receive a pin or the like to hold the ring in position after an external tangential force has been applied to increase the inner diameter. The tangential force applied to the ring increases its original internal diameter but does not increase it to a diameter greater than the outer diameter of the shaft or rod to which it is to be applied. The ring is then held in this position by means of the pin inserted in the apertures 2 and its surface is machined until its inner diameter is equal to the outer diameter of the shaft or rod to which it is to be applied. The pin is then removed and the ring will exert a uniform internal pressure inwardly upon the shaft or rod and a perfect durable fluid-tight joint will be effected.

Figure 5 shows a ring made of cast or forged metal having a stepped joint. The inner diameter is less than the outer diameter of the shaft or rod to which it is to be applied. Its inner diameter is then decreased to a diameter which is less than the diameter of the rod or shaft to which it is to be applied and by annealing or any other convenient treatment, the ring will normally tend to maintain this position. A wedge 3 or the like as shown in Figs. 7 and 8 is then inserted in the stepped joint, forcibly opening the ring. The inner surface of the ring is then machined until its inner radius is equal to the outer radius of the shaft or rod to which it is to be applied.

If the shaft or rod is very small, or when it is desirous to use leather or asbestos, etc. to be pressed upon a shaft or rod by uniform pressure exerted by the new packing ring, it is preferable that segmental blocks 4 and 4′, and a leather 5 etc. are arranged outside the shaft or rod so that these blocks and leather will be pressed inwardly by means of the packing ring. In this case, however, the inner surface of the packing ring, after forcibly opened by tangential force only, must be lathed under the caution that its inner radius accurately coincides to the outer radius of a ring composed by a series of the segmental blocks.

Instead of forcibly opening a split blank ring by tangential force by means of a pin 2 or a wedge 3 (Figs. 3 and 4), the ring may be opened by an electromagnetic chuck applied to the ring from outside as shown in Fig. 10. Here, strong electromagnets 7 and 7′ each having the same force are arranged at equi-distance around the ring 1. The finished ring after having been machined so that its inner radius is exactly equal to the outer radius of a shaft or rod, will exert a uniform external pressure upon the shaft or rod. Further, instead of such electromagnets, a series of small holes may be provided at equi-distance along the circumference of the ring and the ring may be opened by applying equal outwardly pulling forces at each of the holes.

It follows that the operation may be applicable upon a metallic cylinder and the cylinder, after the inner wall is finished according to the present method, may be cut into a plurality of rings by any convenient manner.

We claim:

1. The method of manufacturing discontinuous metallic packing rings adapted to form a tight joint consisting in manufacturing a discontinuous overlapping metallic ring having an inner diameter smaller than that of the predetermined diameter of the finished ring, opening the ring by means of a tangential force, said opening thereof of the ring still maintaining the inner diameter of the ring less than the predetermined diameter of the ring, and lathing the inner wall of the ring to the predetermined diameter of the finished ring.

2. The method of manufacturing discontinuous metallic packing rings adapted to form a tight joint consisting in manufacturing a discontinuous overlapping metallic cylinder having an inner diameter smaller than the predetermined diameter of the finished ring, opening the ring by means of a tangential force, said opening thereof of the cylinder still maintaining the diameter of the cylinders less than the predetermined diameter of the finished ring, lathing the inner wall of the cylinder to the predetermined diameter of the finished ring and cutting said cylinder into a plurality of packing rings.

In testimony whereof we affix our signatures.

MASATOSI OKOCHI.
KEIKICHI EBIHARA.